United States Patent [19]

Gusek et al.

[11] Patent Number: 5,456,930
[45] Date of Patent: Oct. 10, 1995

[54] DIELECTRIC HEATING TREATMENT OF UNCHLORINATED CAKE FLOUR

[75] Inventors: Todd W. Gusek, Crystal; James R. Korslund, Edina; Vinod W. Padhye, Maple Grove, all of Minn.

[73] Assignee: General Mills, Inc., Minneapolis, Minn.

[21] Appl. No.: 173,456

[22] Filed: Dec. 23, 1993

Related U.S. Application Data

[63] Continuation-in-part of Ser. No. 903,384, Jun. 24, 1992, Pat. No. 5,389,388.

[51] Int. Cl.$^6$ ....................................... A21D 6/00
[52] U.S. Cl. .......................... 426/242; 426/244; 426/622
[58] Field of Search ............................. 426/622, 242, 426/237, 244

[56] References Cited

U.S. PATENT DOCUMENTS

| | | | |
|---|---|---|---|
| 3,428,467 | 2/1969 | Hatton et al. | 426/653 |
| 3,597,224 | 8/1971 | Howard et al. | 426/622 |
| 3,620,764 | 11/1971 | Watkins | 426/241 |
| 3,640,730 | 2/1972 | Rolland et al. | 426/622 |
| 3,869,558 | 3/1975 | Hampton et al. | 426/622 |
| 3,974,298 | 8/1976 | Cauvain et al. | 426/622 |
| 4,157,406 | 6/1979 | Hanamoto et al. | 426/622 |
| 4,259,362 | 3/1981 | Hanamoto et al. | 426/622 |
| 4,294,864 | 10/1981 | Kulp et al. | 426/549 |
| 4,416,908 | 11/1983 | McKinney et al. | 426/241 |
| 4,524,080 | 6/1985 | Sugisawa et al. | 426/622 |
| 4,608,261 | 8/1986 | MacKenzie | 426/242 |
| 4,632,833 | 12/1986 | Gannon | 426/242 |
| 4,650,681 | 3/1987 | Greethead | 426/622 |

FOREIGN PATENT DOCUMENTS

| | | |
|---|---|---|
| 2110065 | 10/1971 | France. |
| 2442552 | 9/1974 | Germany. |
| 1499986 | 5/1974 | United Kingdom. |

OTHER PUBLICATIONS

Effects of Microwave Radiation and Storage On Hard Red Spring Wheat Flour, Cereal Chemistry 58(1):53–56, 1981.
Chemical Abstracts, 77(23): 150661 v, abstracting Aref et al. "Inactivation of alpha amylase in wheat flour with microwaves," J. Microwave Power, 7(3), 215–21 (Eng) 1972.

*Primary Examiner*—George Yeung
*Attorney, Agent, or Firm*—John A. O'Toole; L. MeRoy Lillehaugen

[57] ABSTRACT

The present invention provides methods for improving the baking properties of cake flour using either high intensity dielectric heating, (10 GHz to 3 MHz) and/or radio frequency heating (300 MHz to 3 MHz). The treated cake flour is intended as a substitute for chlorinated cake flour. The present unchlorinated, dielectrically heated treated cake flour is an essential ingredient in dry mixes for batter baked goods especially high sugar-to-flour ratio layer cakes. In addition to other dry mix ingredients, preferred dry mixes additionally essentially comprise about 0.15% to 0.45% triglycerol monostearate for even greater enhancement of finished baked goods' volume. The method comprises exposing cake flour having a moisture content of >8% to sufficient amounts of radio frequency energy to heat the flour to a temperature of about 230° to 270° F. and to a finished moisture content of less than 6%. Preferred radio frequency heated flours are additionally characterized by a peak pasting viscosity of at least 350 Stir Number Units. In another aspect, a second method has been found that can obtain cake flours having a Stir Number Unit value of >400.

17 Claims, 4 Drawing Sheets

DIELECTRIC HEATING TREATMENT OF UNCHLORINATED CAKE FLOUR

CROSS REFERENCE TO RELATED APPLICATION

This is a continuation-in-part application to U.S. Ser. No. 07/903,384, filed Jun. 24, 1992, now U.S. Pat. No. 5,389,388.

FIELD OF THE INVENTION

The present invention relates to food products and methods of their preparation. More particularly, the present invention relates to unchlorinated cake flour, to dielectric heating methods for preparing unchlorinated cake flour, and to dry mixes for batter based baked goods comprising such unchlorinated cake flour.

BACKGROUND OF THE INVENTION

In the United States, chlorinated cake flour is a staple of commerce. Chlorinated cake flour is used in a wide variety of food products, especially chemically leavened food products which are commonly referred to as batter based. Primarily, however, chlorinated cake flour is used in the preparation of high ratio layer cakes. Such layer cakes are referred to as "high ratio" because the sugar-to-flour ratio is substantially in excess of 1:1. More typically, these high ratio layer cakes are in the order of about 1.25–1.30:1. Such high sugar containing layer cakes are desirable because of the texture, flavor, tenderness, and other attributes the high level of sugar imparts to the finished baked good.

Chlorinated cake flours are used in such high ratio layer cakes since chlorinated flour allows the preparation of a finished high ratio baked layer cake having the combination of features of 1) a high specific volume (i.e., low density), and 2) good eating qualities of moistness and tenderness. When unchlorinated flour is used, the resultant finished cake baked good is unacceptably dense and exhibits a poor texture. Furthermore, since chlorination has a mild bleaching effect, the color of white cake is modestly improved when chlorinated flour is incorporated into a layer cake mix.

In commercial practice the extent of chlorination is expressed in ounces of chlorine per 100 lbs of flour ("oz/cwt"). For a chocolate layer cake (not requiring a bleached flour), the flour may be chlorinated to about 2 oz/cwt (1.25 g/kg). A white layer cake may require 3 oz/cwt (1.8 g/kg) and an angel food cake (shortening and egg yolk free type cake) may require up to 4 oz/cwt (2.5 g/kg). Typically, however, chlorination is not a sufficiently strong bleaching operation for cake flour to be incorporated into a white layer cake or an angel food cake and such flour is additionally or further treated with a stronger bleaching agent (e.g., apx 50 ppm of benzoyl peroxide) to further whiten the flour.

As a result of the use of chlorinated flour, Americans have grown accustomed to cakes possessing the desirable attributes of high ratio cakes, particularly both high volume and tenderness.

Notwithstanding the acceptance in the United States of chlorinated cake flour, chemical treatments and chemical additives to foods have become suspect and it is desirable to avoid such treatments and additives wherever possible. In addition, most foreign countries prohibit the use of chlorinated cake flour in their cake products. As a result, these countries do not allow importation of American dry mix products such as cake mixes and the like which contain chlorinated flour.

In view of these concerns and limitations regarding chlorinated cake flour, there have been numerous attempts at developing substitutes for chlorinated cake flour and methods for preparing such unchlorinated cake flours. Indeed, the art contains many references proclaiming the final solution to providing a chlorinated flour substitute. Notwithstanding these optimistic representations, to date, the use of chlorinated flour is still widespread and no commercially feasible substitute or process therefor has yet been developed or adopted.

These various treatments of flour have not been adopted for two primary reasons. First and foremost is their cost. Second is their performance.

Flour milling is a commodity business. The implication of this fact is that the difference between profit and loss are expressed in tenths of cents per pound of flour. As a result, flour milling operations are typically very high volume operations. The practical implication is that a potential substitute for chlorination process whose energy and/or capital costs exceed one penny per pound is essentially uneconomical regardless of any minor improvement in flour baking performance.

Most of the known described flour treatment techniques have not been adopted because either the optimum treatment conditions were too long (leading to excessive capital and/or energy costs) and/or the treatment results in commercial practice are not as beneficial as originally hoped (i.e., the taught methods don't work very well). Also very expensive, relatively speaking, are starch extraction processes wherein the starch fraction is separated from the gluten fraction. With these general observations regarding the deficiencies of known methods for treating flour to obtain a substitute for chlorinated flour and the primary importance of cost in determining the commercial feasibility of a process, the following is a description of particular technical approaches.

Among its effects, chlorination of cake flour mimics the effect of time as unchlorinated flour ages. Thus, one prior art approach to processing of cake flour to impart the properties of chlorination is to accelerate the aging of cake flour. Since chemical reactions are affected by temperature, various processes have been proposed for heating the flour to improve its properties. Thus, for example, in U.S. Pat. No. 3,490,917, normal, soft wheat flour or starch is subjected first to air classification to obtain a low gluten flour. The low gluten flour is heated at a temperature of 100° to 140° C. for about 30 minutes. Then, the treated flour or starch is combined with dried, viable gluten to give a flour useful in cake and sponge recipes. Recently, in British Patent No. 1,499,986, it was shown that the preliminary air classification step is unnecessary.

In U.S. Pat. No. 3,428,461 a method is taught involving heat treating a bread flour for preparing a substitute for chlorinated flour.

Rather than treating flour itself, another approach is to formulate dry mixes using unchlorinated flour to include particular ingredients which compensate for the absence of the beneficial properties of flour chlorination. In this approach, two techniques have been most common. One technique involves selection of particular emulsifier or emulsifier blends to impart one or more properties to the finished layer cake product. (See for example, U.S. Pat. No. 3,597,224 issued Aug. 3, 1971, which discloses addition of a sodium sulfoacetate emulsifier.)

In the other common technique, a pure starch is added in requisite amounts in partial substitution for the cake flour. As a generalization, better cake flours are characterized by low protein contents. Even better cakes are prepared using the pure starch fraction of cake flour. However, extraction of the starch from the cake flour is relatively expensive. Thus, in order to optimize a layer cake formulation using unchlorinated flour, the formulator must balance the improvements obtained from inclusion of the starch component of cake flour against the increase in the cost of such a pure starch containing formulation. Of course, the cost of using pure starch can be reduced by substituting a more functional starch and/or by using less expensive substitutes for wheat starch. An example of this approach is found in U.S. Pat. No. 4,294,864 (issued Oct. 13, 1981 and assigned to The American Institute of Baking) wherein starch and other dry mix ingredients are used to formulate a high ratio cake mix using unchlorinated starch.

Chlorination also affects the temperature at which gelatinization occurs and generally lowers the gelatinization temperature. Thus, another approach in the art has been to partially swell or gelatinize the starch component of cake flour. An example of this approach is found in U.S. Pat. No. 4,157,406 (issued Jun. 5, 1979) wherein unbleached flour is heated to about 49° to 93° C. for one hour up to 10 weeks, preferably about four days, to improve its baking properties. An improvement in this process is described in U.S. Pat. No. 4,259,362 (issued Mar. 31, 1981 to Hanamoto et al.) involving unbleached bread flour. Unfortunately, such long treatment times are economically impractical for a bulk commodity such as cake flour.

GB, A, 1,499,986 (J. Lyons and Company Limited, 1 Feb. 1978) is directed towards high ratio cake mixes comprising a heat treated flour substitute for chlorinated cake flour. However, the heat treatment described does not teach high intensity microwave heating but rather conventional thermal heating or conventional microwave heating. Moreover, thr '986 patent is silent about the use of radio frequency heating.

U.S. Pat. No. 3,428,461 issued 18 Feb. 1969 to W. A. Hatton and E. R. Lowry is directed towards a dry mix for a high ratio cake including a flour component that has been dry heated to 150° to 360° F. (65° to 182° C.) for about one minute to 17 hours. However, the patent does not teach the use of high intensity microwave heating or radio frequency heating.

DE A 2, 442,552 (Flour Milling and Baking Research Association, 13 Mar. 1975) and, equivalently, U.S. Pat. No. 3,974,298 issued 10 Aug. 1976 to Cauvain et al., describes a method for preparing a heat treated flour by heating at 120° to 60° C. for about 5 to 60 minutes.

Given the state of the art, there is a continuing need for new and useful cake flour substitutes for chlorinated cake flour.

Accordingly, it is an object of the present invention to provide new and useful techniques for treating unchlorinated cake flour to improve the baking properties thereof so as to realize a substitute for conventional chlorinated cake flour.

Another object of the present invention is to provide an untreated cake flour substitute for conventional chlorinated cake flour.

Still another object of the present invention is to provide unchlorinated cake flour substitutes for chlorinated cake flour useful in the preparation of a variety of dry mixes for baked goods, including layer cakes.

Still another object of the present invention is to provide methods for the treatment of unchlorinated cake flour so as to provide a treated unchlorinated cake flour product useful in substitution for conventional chlorinated cake flour.

Still another object of the present invention is to provide methods for providing an unchlorinated cake flour substitute for chlorinated cake flour which are economically practical.

Still another object of the present invention is to provide methods for treatment of unchlorinated cake flour for the preparation of chlorinated cake flour substitutes which can be practiced in conventional cake flour milling operations.

Still another object of the present invention is to provide an unchlorinated cake flour substitute for chlorinated flour which upon addition to a dry mix for a layer cake provides improvements in both finished baked goods' volume and texture.

Still another object of the present invention is to provide an economical method for treating unchlorinated cake flour to realize a substitute for chlorinated flour which methods are economically competitive with the capital and processing costs of chlorination of cake flour.

Still another object of the present invention is to provide methods for treating unchlorinated cake flour so as to produce a cake flour substitute for chlorinated flour which exhibits improved baking properties including both volume and texture.

Still another objective is to provide methods for improving the baking properties of an unchlorinated flour that exhibits months of stability with respect to the improvement in baking properties.

Still another object of the present invention is to provide improved flours exhibiting improvements in baking properties.

Still another object of the present invention is to provide dry mixes for high ratio layer cakes which upon preparation into finished baked goods exhibit high volumes and good eating qualities that do not require chlorinated flour or expensive starch fractions.

Surprisingly, the above objectives can be realized and new and useful unchlorinated cake flour substitutes can now be prepared. The present improved cake flour is obtained by radio frequency heating raw unchlorinated cake flours to particular moisture contents.

The present invention provides a further improvement from the process of the parent application in the surprising discovery that radio frequency heating can also be used as well as or in addition to microwave heating. Moreover, radio frequency has been found to be unexpectedly superior to microwave treatment of cake flour. Also, another method has been found to obtain cake flours, especially unchlorinated flours, that have SNU values >400, namely, using radio frequency heating. In another aspect, flours having SNU values higher than 425 and even 450 have been obtained; higher values than obtained through microwave heating to similar moisture contents. Also, flours having SNU values as low as 350, if obtained by radio frequency heating, can be used and provide improved baked goods compared to other treatments, including microwave heating, to equal SNU values.

SUMMARY OF THE INVENTION

In its primary product aspect, the present invention provides radio frequency and high intensity dielectrically heat treated unchlorinated cake flour of improved baking and eating quality. The flour is characterized by having been subjected to sufficient amounts of radio frequency or dielectric heating to reduce the moisture content to about 1% to about 6%. The protein content ranges from about 4% to 9%. Cake flours are selected from soft red or white winter wheat flours.

In another product aspect, the present invention resides in dry mixes for batter based baked goods comprising the present microwave treated unchlorinated cake flour as the principle structuring agent and to the finished baked goods resulting from preparation therefrom. The present dry mixes comprise sugar, leavening, and about 30% to 45% of the present flour.

In still another product aspect, the present invention provides treated flours of improved baking qualities characterized by high peak pasting viscosity values whether prepared by microwave treatment or by any suitable method. The improved flours are essentially characterized by a peak pasting value of at least 350 Stir Number Units and having been dried with radio frequency to a moisture content of 6%>.

In its method aspect, the present invention resides in radio frequency heating treatment methods preferably at atmospheric pressure involving the step of exposing flour having an initial moisture content of 8% to 14% with sufficient amounts of radio frequency energy at atmospheric pressure to heat and dry the flour to produce a dielectrically heat treated unchlorinated cake flour of superior baking and storage properties. The radio frequency heat treatment step is continued for times sufficient to heat the flour to about 220° to 290° F. (104.4° to 143° C.) and to reduce the moisture content to between about 1% to 6%.

DETAILED DESCRIPTION OF THE INVENTION

In its primary product aspect, the present invention provides dielectrically heat treated unchlorinated cake flour of improved baking and storage quality and to dry mixes for batter based baked goods comprising the microwave treated cake flour. In its process aspect, the present invention comprises the methods for providing chlorinated cake flour. Each of these product attributes, dry mix ingredients, and process steps are described below in detail.

Throughout the specification and claims, percentages are by weight and temperatures in degrees Fahrenheit unless otherwise indicated.

The preferred starting material for the present method of preparation is raw cake flour. By "raw" cake flour it is meant herein undehydrated, nonchlorinated cake flour whether or not bleached with a nonchlorine bleaching agent. Cake flours are also conventionally characterized by a relatively low level of the bran fraction. Preferred for use herein are those cake flours having less than about 0.5% bran. The present invention comprises the treatment of soft wheat flour which is generally referred to as cake flour. Cake flour has a protein content ranging between about 4% to 9%. Cake flour or soft wheat flour is to be distinguished from bread flour which is a hard winter or spring wheat flour. Bread flour generally and desirably has a protein content ranging from about 10% to 14%.

Useful herein are both unbleached raw cake flours (i.e., not having been treated with a bleaching agent) and bleached, unchlorinated raw cake flours and mixtures thereof. Such bleached, unchlorinated cake flours are prepared by treating the flour with nonchlorine based chemical bleaching agents such as benzoyl peroxide or nitrogen tetroxide.

The present cake flour starting material is further essentially characterized by an initial moisture content of 8% so that the cake flour has sufficient moisture so as to be able to interact with the high frequency field. The flour can be either undehydrated (i.e., about 14% moisture) or partially dehydrated by conventional heating or by partial treatment with microwave heating prior to being radio frequency heated. Blends of flours are also contemplated herein.

The present method essentially involves the step of exposing the raw unchlorinated cake flour to dielectric heating for sufficient times to reduce the moisture content to 6%>.

The dielectric heating or exposure step is preferably practiced at atmospheric pressure.

In preferred embodiments, the flour is heated by dielectric energy to a temperature of about 220° to 290° F., (104.4° to 143° C.) preferably about 230° to 270° F., (110° to 132° C.).

Dielectric heating, or equivalently in the art "high frequency" heating is used in its conventional sense (see, for example, "Industrial Microwave Heating," A. C. Metaxas and R. J. Meredith, 1983, pg. 2) to include both portions of the microwave and radio frequencies (10 GHz to 300 MHz) and the radio frequency range (300 to 3 MHz). Of course, the above description does not include the much higher frequencies of infrared radiation. Infrared radiation has been found not to be useful herein since the heat effect is only upon the surface of the flour rather than within the starch granule itself.

A conventional microwave oven can be used to practice the present microwave exposure step. Conventional microwave ovens are characterized by a relatively low field intensity, i.e., about 10 to 50 V/cm depending in part upon the load. Microwave field intensity can be described, of course, in various ways. In the present invention, the microwave field intensity is described in a conventional manner as a voltage gradient in free space, e.g., volts per centimeter ("V/cm") especially using microwave heating.

In one embodiment of the present invention, the flour is more preferably subjected to a high intensity dielectric field having a field density ranging from about 50 to 125 V/cm. In the microwave embodiment either of the two licensed microwave frequencies permitted at present, 2450 MHz and 915 MHz, can be used.

Measurement and/or calculation of field strength can be troublesome. Useful to measure such high intensity microwave field strength herein is a Microwave E-Field Probe or meter (Model No. MEF-1.5) available from Luxtron Corp. (Mountain View, Calif.).

High intensity (i.e., providing a field strength of 50–350 V/cm) microwave equipment that can provide the desired field strength is also commercially available. Useful herein for practicing the present methods are industrially sized microwave ovens from Cober Electronics, Inc. and, preferably APV Baker, Inc. (For a good description, see GB 2,193,619A by R. J. Meredith and John Milton.) Minor modifications to the equipment may be required to adapt the equipment from a known application, e.g., rubber curing, to the sanitary standards that are conventional for food processing. Usually, the power can be adjusted downwardly or upwardly in such equipment to provide the desired microwave field intensity.

In the radio frequency embodiment, an advantage is that energy penetration into the flour increases as the frequency of radio heating decreases. Increasing penetration increases the permissible flour bed depths which in turn lead to great flour throughputs and increases in the economy of scale.

Radio frequency heating has been found to be unexpectedly superior to even microwave heating. In one aspect, radio frequency can obtain flours having a peak pasting viscosity of as high as 450 SNU, a value not previously obtained even by microwave heating. Even more surprising, radio frequency treated flours appear to provide higher volumes in finished cakes even when the SNU values are lower and a less gummy texture. While not wishing to be bound by the proposed theory, the lower temperature in FIG. 4 at which the peak value is obtained may correspond to earlier in the baking cycle and result in higher finished cake volume even at lower SNU values.

Radio frequency equipment is available commercially from, for example, Proctor Strayfield (UK and Horsham, Pa. and also from Nemeth Engineering, Crestwood, Ky.

The exposure of the flour to the dielectric field is continued for sufficient time to impart the desired baking property benefits taught herein. In more preferred embodiments, dielectric exposure is continued so as to realize a flour characterized by a reduced moisture content of about 1% to 5%. Of course, the particular exposure times will vary depending upon such factors as the degree of treatment preferred, the power and performance characteristics of the equipment selected including the field characteristics it develops; whether supplemental thermal heating is provided, the quantity of flour being processed at any time, the starting and ending moisture contents, and equipment power density. While not critical per se, good results generally are obtained when the raw cake flour is exposed for times ranging from about 30 seconds to 25 minutes. Better results in terms of toasting and stability improvements are obtained when exposure times range from about 40 seconds to 3 minutes. For best results, exposure times desirably range from about 1 to 2 minutes. Generally, longer exposure times are selected when greater treatment is desired. Conversely, when supplemental heating is supplied, or if less treatment is desired, then shorter exposure step durations are used.

The dielectric heating step is continued so as to reduce the moisture content from the native level to about 1% to 6%, preferably less than about 1% to 5% by weight and for best results about 2% to 3%. In even more preferred embodiments the heating step is continued so as to achieve cake flour final temperatures ranging from about 220° to 290° F. (104° to 143° C.), preferably about 230° to 270° F. (110° to 132° C.), and for best results about 260° F. (127° C.).

The bed depth of the flour selected for the dielectric treatment can depend upon a variety of factors including the desired baking properties, frequency, field intensity, dry mix formulation, etc. In the high intensity microwave embodiments herein, good results have been obtained with bed depths ranging from about 10 to 100 mm. Even better results in terms of evenness of treatment and finished baking quality improvements are obtained with bed depths ranging from about 15 to 50 mm for microwaves, and for best results, a bed depth of about 20 to 30 mm has been used. A particular advantage of using radio frequency is that deeper bed depths can be used. Thus, for given equipment, a greater rate of flour throughput is possible using RF heating. For radio frequency, the bed depth can range from 1 to 200 mm, preferably about 40 to 200 mm and for best results about 60 to 150 mm. The difference in throughput for Rf flour can have an influence on the economic feasibility of such flour treatment.

Both batch processing (e.g., a single pass on a conveyor belt) and continuous processing (e.g., recirculation within a treatment chamber) are contemplated herein.

In one embodiment, the present step can employ preheated cake flour, e.g., 200° F., (93° C.), as the starting material as compared to employing cake flour at ambient temperature. The two primary advantages to using preheated cake flour are increases in throughput and reduced microwave or radio frequency energy consumption. Since the cake flour must, in more preferred embodiments, reach a final temperature, instead of using relatively more expensive microwave or radio frequency energy, less expensive thermal energy can be used to partially heat the flour. Using preheated cake flour, of course, will modestly reduce the duration of the microwave heating step. Also, since less time in the microwave oven is required to treat the cake flour, the throughput using a microwave oven of a given kilowatt capacity can be increased. Still another advantage of preheating the flour is to reduce the likelihood of condensate formation on "cold flour" which adversely may cause temporary clumping of the otherwise free-flowing flour.

If desired, the present dielectric heating step can be practiced employing supplemental thermal heating of the cake flour whether prior to and/or simultaneous with the dielectric energy treatment of the cake flour. By thermal heating herein is meant, for example, forced hot air convection heating or conventional oven heating.

In another variation, optionally, the cake flour can be bleached by conventional non-chlorine bleaching agents. Such bleaching can be practiced either before or after the present microwave step as convenient. Bleaching is practiced in a conventional manner by exposure of the cake flour to a suitable bleaching agent such as benzoyl peroxide or nitrogen tetroxide such as to achieve a concentration of about 50 to 100 ppm.

The skilled artisan will appreciate that the final moisture contents herein are expressed to indicate the extent of dielectric treatment necessary to achieve the baking property improvement provided herein. Thus, in certain applications, the dielectrically heat treated flour having been reduced in moisture content to achieve the benefits herein may be modestly rehydrated. The dielectric heat treatment is continued to achieve an at least 50% reduction in moisture content from the flour's initial moisture level and preferably at least 65%. Thus, if an exceptionally wet flour (such as due to a wet crop year) is treated, e.g., 15%, then the minimum degree of microwave treatment should reduce the moisture content at least about 7% to 8%.

While the above methods find particular suitability for use in the treatment of unchlorinated cake flour for the preparation of a cake flour substitute for conventional chlorinated cake flour, the present radio frequency heat treatment has, most surprisingly, further been found to be helpful in the treatment of a wide variety of flours. In particular, the radio frequency process can be used with chlorinated cake flour as the starting material. The resultant treated chlorinated cake flour also shows improvements in eating quality and, to a lesser extent, in volume.

Additionally, the present method can be used in connection with all-purpose flour (e.g., soft white wheat) or even bread flours (e.g., hard red winter wheat). In such modifications of the present invention, the flours are treated in a manner comparable to the above described unchlorinated cake flour so as to realize dielectrically heat treated flours essentially characterized by moisture contents within the above described ranges. As noted above, a variety of prior art techniques are known for treating unchlorinated cake flour so as to achieve increases in finished volume in the baked goods prepared therefrom. In the present invention of microwave treated unchlorinated cake flours, not only are increases in volume compared to unchlorinated cake flour obtained, but also, more importantly, dramatic improvements in the eating qualities and texture of the finished baked goods prepared therefrom is improved.

The dielectrically heat treated unchlorinated cake flour provides generally about a 20% to 30% improvement in finished layer cake volume (using a conventional white layer cake test formulation) compared to otherwise identical layer cakes using comparable amounts (dry weight basis) of unchlorinated cake flour that has not been dielectrically heat treated.

In still other aspects, the present dielectrically heat treated process can be used to improve aged non-chlorinated cake flours, or heat treated, non-chlorinated cake flours (i.e., accelerated aging). Both dramatic improvements in eating quality and modest improvements in volume can be obtained.

Moreover, if desired, such as for cost or availability considerations, blends of flour can be provided comprising a dielectrically heat treated fraction and an untreated fraction. Of course, in such a blended flour, the benefits provided will be proportional to the amount of treated flour and the extent of its treatment.

It has been further surprisingly discovered herein that these important finished baked good eating quality attributes are importantly correlated with a physical property of the starch component of flour generally referred to in the art as peak pasting viscosity. In the baked goods art, a known but newer analytical technique is rapid viscometry analysis ("RVA") using a commercially available instrument named simply a Rapid Viscosity Analyzer. In RVA analysis, a quantity of a farinaceous material is admixed with buffered water and heated continuously with stirring. As the starch imbibes water with increasing temperature, the viscosity is measured and 0 expressed in units referred to as "Stir Number Units" ("SNU's").

The traditional means to evaluate starch containing products is to infuse a pasting curve analysis using a Brabender Visco/Amylograph. (A good description of Amylograph testing as well as analytical techniques, methodology and apparatus is contained in "The Amylograph Handbook," The American Association of Cereal Chemists, 1980). In this analysis, a dilute starch slurry is gradually heated (25° to 95° C.) in a temperature regulated rotating vessel while a spindle monitors the instantaneous viscosity of the slurry. The Amylograph viscosity expressed in Brabender Units ("B.U."). More recently, however, a new analytical instrument called a Rapid Visco/Analyzer "RVA") has become commercially available that is capable of generating pasting curves similar to those generated by the Amylograph. The RVA instrument, in some respects, is better than the Amylograph in that a complete pasting curve analysis can be generated in about one-fourth of the time required. Additionally, the RVA uses four grams a sample as compared to the 50 grams generally needed for the Amylograph. The RVA pasting curve provides the same basic insights to the characteristics of the starch in a food system as the Amylograph. Of course, one difference regarding the interpretation of data between the two instruments pertains to the units used to express the starch slurry viscosity. As mentioned above, the Amylograph viscosity is expressed in Brabender units while the RVA viscosity is expressed in Stir Number Units. More detailed description of the RVA equipment and analysis procedure is given in Example 1 below.

While not wishing to be bound by the proposed theory, it is speculated herein that cake structure development is intimately tied to gelatinization of the starch fraction of the cake flour. Gelatinization is promoted by heat and requires the presence of water. Chlorine treatment of cake flour, among other things, is thought to promote the ability of starch granules to take up water during heating of the batter system above 50° C. This process of gelatinization induces the swelling of starch granules to many times their original size. The swollen, gelatinized starch granules provide the honeycomb open-celled structure of the finished cake which stabilizes it against collapse upon cooling. Starch gelatinization also contributes to crumb tenderness, slightly dry texture, and development of fine-grained cells.

Unchlorinated cake flour does not provide these structural characteristics simply because the starch fraction is more impervious to water during the bake cycle. Inability to gelatinize (which is correlated with viscosity increases) is evident by the lower RVA pasting profile numbers. Cakes prepared from unchlorinated flour show excessive expansion in the oven, but suffer from severe collapse upon cooling with under-developed cell structure and a gummy crumb. Radio frequency treatment of unchlorinated flour restores the ability of starch to gelatinize and swell. The RVA behavior nicely predicts the flour's functionality in the high ratio cake.

The RVA records viscosity of flour/water admixture as a function of continuous increases in system temperature over time. Maximum temperatures achieved are comparable to the baking cycle.

To show the effects of microwave treatment and other treatments on the temperature vs. viscosity profile, a series of tests were undertaken (and are further described below in Example 1). The results of such testing are graphically depicted in FIGS. 1–3.

Figure 1:
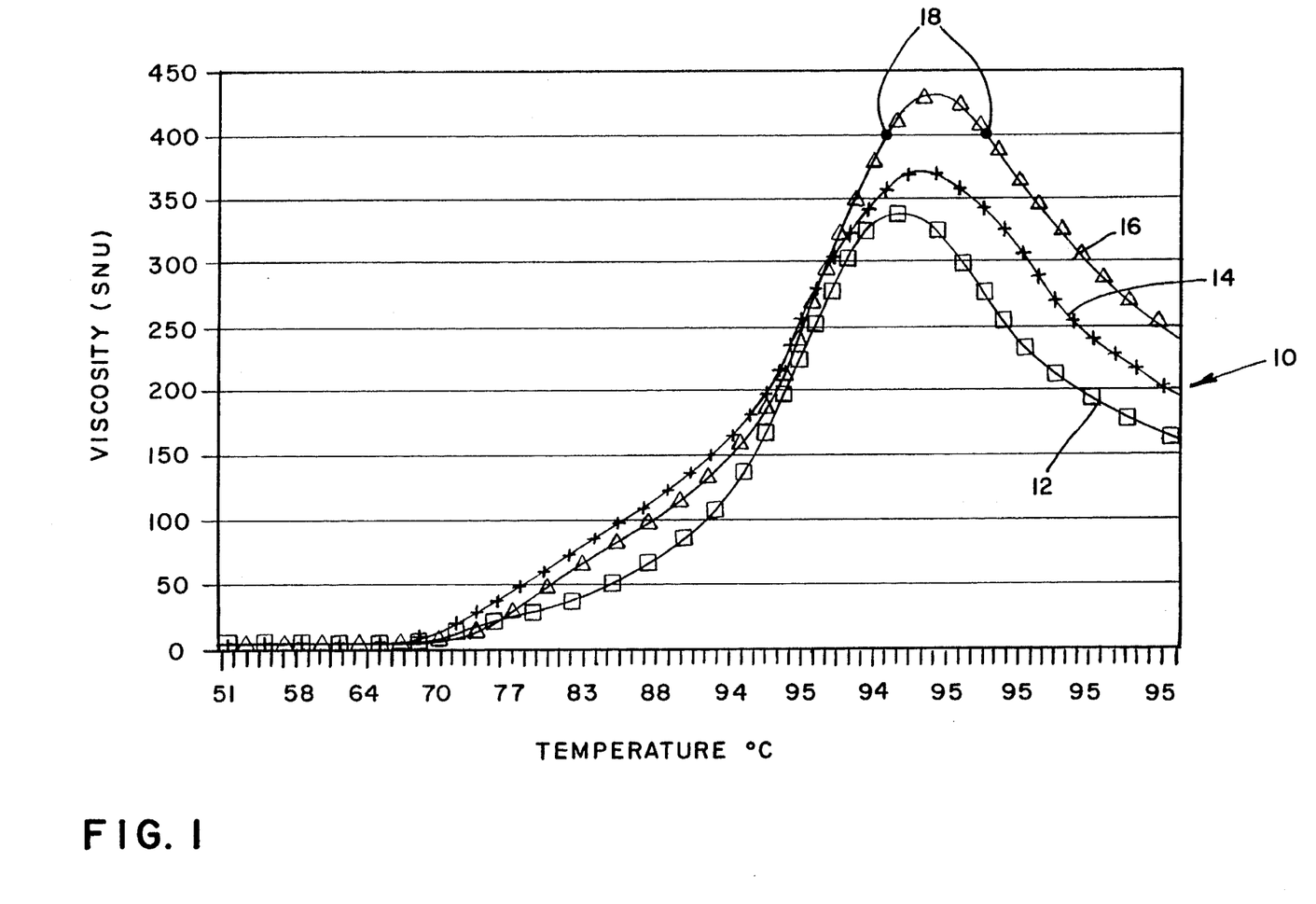
FIG. 1 is a temperature vs. viscosity graph depicting viscosity profile curves of a microwave treated flour of the present invention as well as for untreated cake flour and chlorinated cake flour.

Referring now in particular to FIG. 1, there is shown a graph of temperature vs. viscosity starch pasting curves expressed in SNU generally designated by reference numeral 10. Graph 10 includes a first pasting curve 12 for untreated, unchlorinated cake flour.

As described in the above RVA descriptive reference, samples involve 4 g of treated material dispersed in sufficient phosphate buffered (pH 7.0) 25 g water and are adjusted with flour solids or moisture to an equivalent of 12% flour moisture. Generally, the sample is then heated with constant temperature gain and the resistance of the sample measured to stirring and expressed in Stir Number Units. The skilled artisan will appreciate that the precise pasting curve will also vary with particular flour samples due to inherent variations in the flours.

In graph 10, it is seen that the untreated (i.e., unchlorinated, not microwave treated) cake flour reaches a peak pasting curve of about less than 350 SNU. Additionally, graph 10 shows curve 14 depicting the RVA analysis of conventional chlorinated cake flour at its optimum chlorination value of 2.0 oz per 100 lbs flour (pH 4.6). The chlorinated cake flour achieves a peak pasting value of slightly in excess of 350 SNU. Graph 10 further shows curve 16 for the present microwave treated unchlorinated cake flour reduced to a moisture content of about 2.5% which shows a peak pasting value well in excess of 400 SNU indicated by reference 18.

Greater chlorination of flour in excess of 2 oz/100 lbs flour ("cwt") (1.23 g/kg) actually results in a lower peak pasting value. Moreover, greater chlorination generally results in undesirable toughening the texture of the finished high ratio cakes.

The results of such testing indicate that the present microwave treatment methods for realizing a treated unchlorinated cake flour can provide finished cake flours exhibiting even greater peak pasting values than obtained by chlorinated flours.

Figure 2:
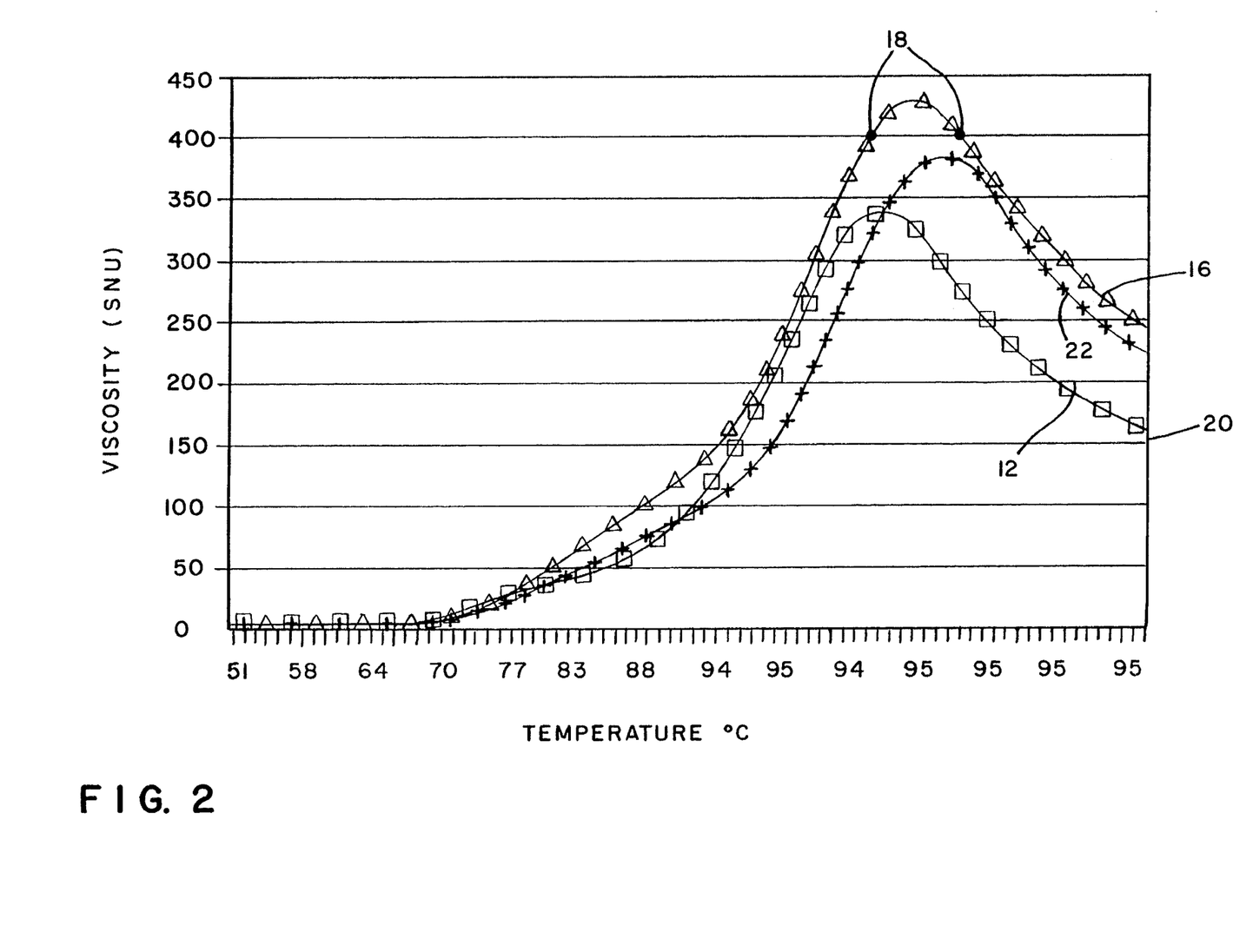
FIG. 2 is a temperature vs. viscosity graph depicting viscosity profile curves of a microwave treated flour similar to that of FIG. 1 as well as untreated cake flour reduced to a comparable moisture content by oven heating and untreated cake flour also similar to FIG. 1.

Reference is now made to FIG. 2 which shows a graph 20 generally similar to that described above for graph 10. Graph 20 also contains curves 12 and 16 for untreated, unchlorinated cake flour and microwave treated unchlorinated cake flour as described above. However, FIG. 2 additionally comprises curve 22 which depicts an unchlorinated cake flour that has been dehydrated to 2.5% moisture by conventional oven heating. FIG. 2 shows thus that an otherwise apparently similar heating/dehydration technique fails to realize a treated, dehydrated cake flour exhibiting the relative superiority in peak pasting values even when dehydrated to equivalent moisture contents.

Figure 3:
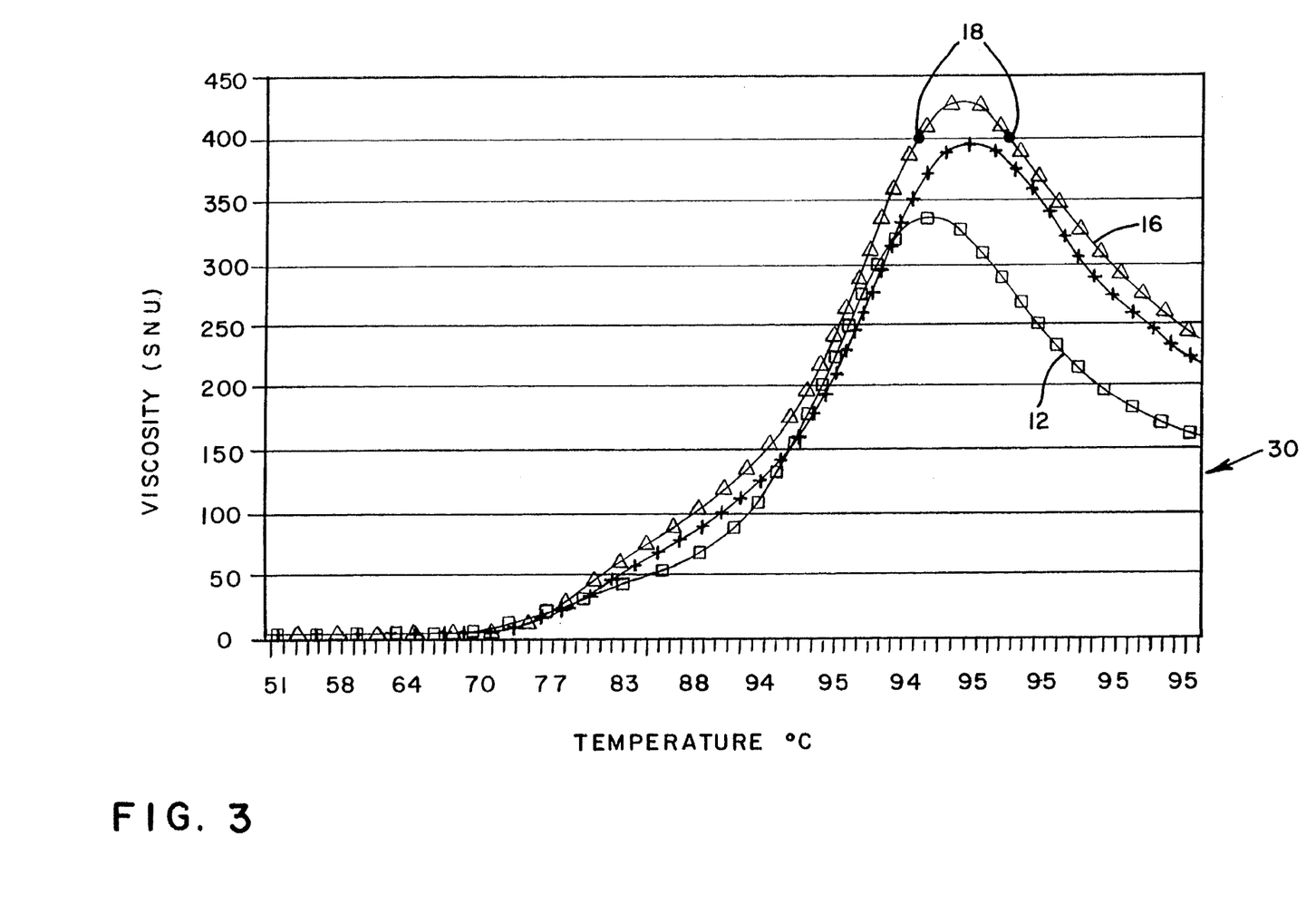
FIG. 3 is a temperature vs. viscosity graph depicting viscosity profile curves of a microwave treated cake flour and an untreated cake flour as in FIGS. 1 and 2 as well as a minimally suitable treatment of cake flour by microwave heating.

Reference now is made briefly to FIG. 3. FIG. 3 depicts graph 30 which is again similar to graphs 10 and 20. Graph 30 similarly includes curve 12 for untreated cake flour and curve 16 for the present microwave treated cake flour. Additionally, FIG. 3 includes curve 34 for a microwave treated cake flour of the present invention having been microwave heated to a moisture content of about 6%. Graph 30 shows that when microwave treated to 6% moisture a cake flour is realized that achieves a peak pasting viscosity value of at least 400 SNU.

FIG. 3 further shows that the important physical value of peak pasting value expressed in SNU's is dose response dependent upon the extent of microwave treatment expressed in percentage residual moisture.

Figure 4:
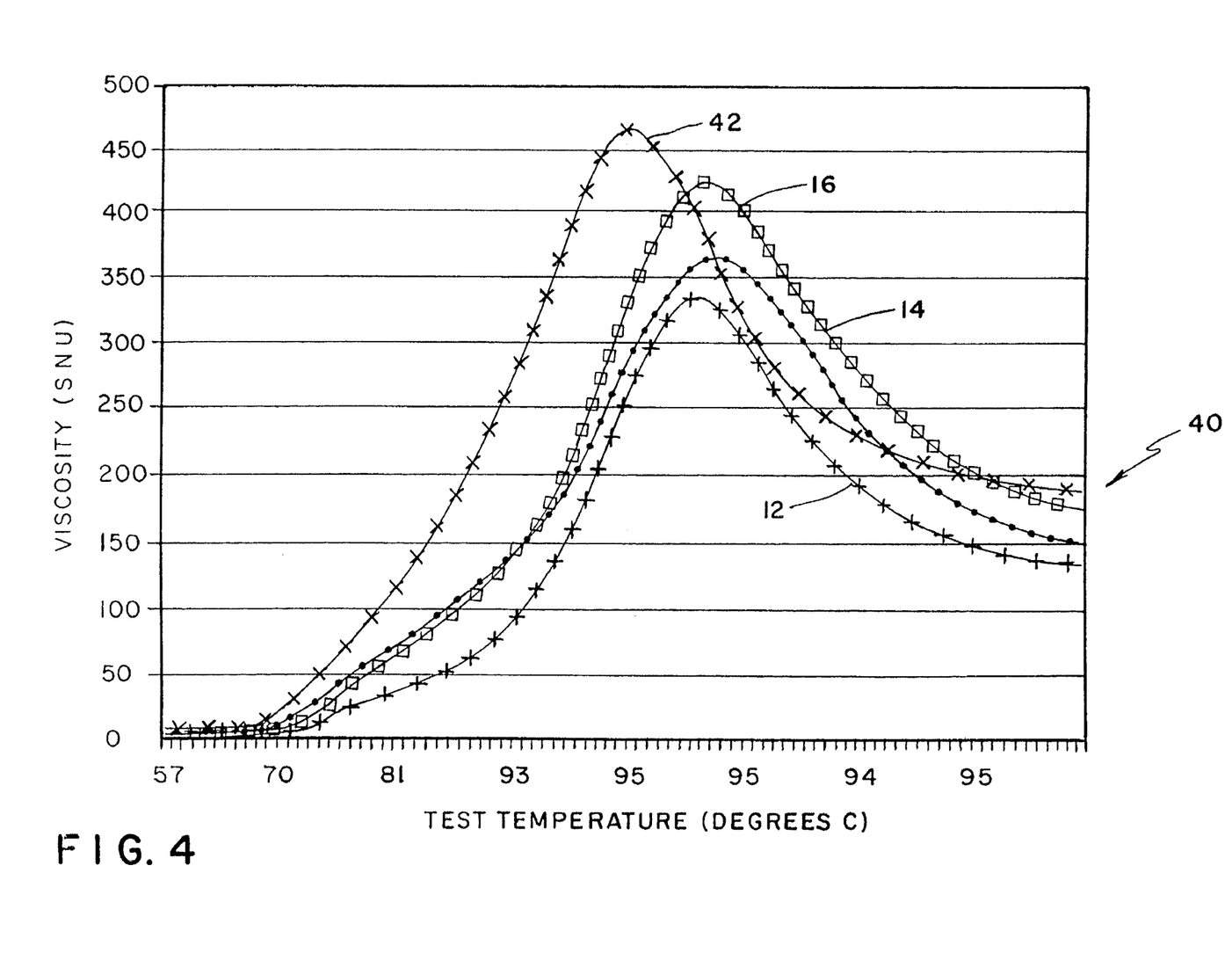
FIG. 4 is a temperature vs. viscosity graph similar to FIG. 3 but additionally including a curve of a radio frequency heat treated cake flour.

FIG. 4 (as further described in Example 8) shows a graph 40 including curves using the same data as from FIG. 3 for untreated flour (curve 12), heat treated curve (curve 14), chlorinated flour (curve 16) and adds curve 42 for a radio frequency heated flour (2.5% moisture) using a similar flour although from a later crop year.

Thus, in its broadest product aspect, the present invention thus pertains to the discovery that peak pasting values are positively correlated with desirable increases in the eating quality and textural attributes of finished baked goods prepared from treated flours. Surprisingly, another method has been found for producing flours essentially characterized by a peak pasting value of at least 400 SNU's. Any other flour treatment technique that achieves a flour having a peak pasting value of at least 400 SNU can be used to prepare improved flours of the present invention.

Moreover, in its broadest method aspect, the present invention resides in the discovery that dielectric heating treatment of any flour type improves the eating qualities of batter based food products prepared therefrom even at equivalent peak pasting SNU values. That is, for example, a flour that has a peak pasting viscosity of 350 SNU having been treated by radio frequency heating is superior (in terms of finished cake attributes of volume and tenderness) than otherwise similar flours of equal SNU value obtained by other flour treatment methods.

The present dielectrically heat treated cake flour so prepared finds particular suitability for use in batter based baked goods and dry mixes therefor, such as are used in the preparation of layer cakes. Batter based food products are to be distinguished from dough based products. Batter based and dough based products appear at a superficial level to be generally similar since each involves a food product comprising a farinaceous material, are combined with moisture to form an intermediate product and are subsequently prepared into a finished baked good by a combination of leavening and heating to obtain an expanded baked good.

Notwithstanding the superficial similarity between these two categories of food products, the underlying structure forming mechanism is fundamentally different. In batter based products, starch upon gelatinization is the important structure forming component. In contrast, in a dough based product, the protein component is responsible for the structure, texture, and primary product attributes in the finished baked good. In a starch or batter based system, the batter is a foam system relying upon the foam forming characteristics of a sugar syrup and a gas for stability of this intermediate product. In contrast, in a dough product, the working of the gluten to form an intermediate structure to entrap the leavening is the important phenomenon. In a starch batter system the presence of protein typically has an adverse toughening affect on the texture of the finished baked good. In contrast, in a dough based product, the starch component has a relatively minimal affect on the end product's attributes which depend primarily upon the qualities of the protein structure for its properties. Starch, upon swelling concomitant with gelatinization, contributes to and ultimately stabilizes the honeycomb-like open-celled structure of the finished baked good. The finished baked goods based upon batter systems are primarily open celled, whereas dough products are primarily closed cell in nature.

While the present invention finds particular suitability for use in the preparation of angel food cake and layer cake dry mixes, the present dielectrically heat treated flours and dry mixes can also be used to prepare such a wide variety of batter based familiar food items such as, but not limited to, donuts, muffins and multipurpose baking mixes (e.g., for quick breads, muffins, pancakes, etc.).

Surprisingly, by virtue of inclusion of the present dielectrically heat treated unchlorinated cake flour, finished baked goods exhibiting both improved volume and improved appearance and eating quality relative to using unchlorinated cake flour are obtained.

Surprisingly, the improvements in baking properties appear to have substantial shelf stability. Dielectrically heat treated flours, even several months after treatment, exhibit the present desirable baking property improvements.

The present dry mixes essentially comprise the present microwave cake flour, sugar, leavening, and emulsifier, and preferably shortening and flavoring.

A. Flour

The present layer cake dry mix compositions essentially contain from about 20% to 50% of the dry mix of the present dielectrically heat treated cake flour. Better results are achieved when the flour level ranges from about 35% to 45% of the dry mix and for best results, about 36% to 39%. The flour useful in the dry mixes of the present invention, of course, is the treated cake flour described above. Thus, the flour which is useful in the practice of this invention is wheat flour having a protein level of from about 4% to 10% of the flour. Traditional cake flour has about 8% protein by weight of the flour. Pastry flour ordinarily has a protein level of about 10% by weight. The preferred protein range for the wheat flour useful in this invention is between about 6% to 8% by weight of the flour. This protein range permits easy removal of the cake from the pan. A good general all-purpose flour also can be used. Such all-purpose flour generally comprises a mixture of both hard and soft wheat flours, i.e., both high protein level and low protein level flours. Such flours are useful if the average protein content ranges from about 8% to 10% by weight.

B. Sugar

The dry mix compositions of the present invention also comprise from about 20% to 70% sugar. Better results are obtained when the sugar level ranges from about 40% to 54%. Typically, sucrose is used in cake mixes as the sugar ingredient although up to about 15% of the sugar in the present dry mix can be supplied by dextrose. Commercially available sugar usually contains up to about 4% starch as an aid to maintaining its free-flowing properties. Preferably, the sugar is included in the mix in amounts of from about 458 to 508 by weight of the mix.

The baker's ratio is the weight ratio of sugar to flour. High ratio cakes have long been preferred for texture and eating quality. The present layer cake mixes essentially have a weight ratio of sugar to flour about 1.20 to 1.35. Better results are achieved when the sugar to flour ratio in the present mixes ranges from about 1.27 to 1.34. Baker's ratios for angel food cakes are even higher and range from about 2.2 to 2.4:1 sugar to flour.

In a preferred embodiment, a substantial portion of the sugar ingredient is finely ground or powdered. Finely ground sugars aid the pourability of the present dry mixes, particularly when plastic shortening is used at high levels. Better results are achieved when at least 508 by weight of the sugar component has an average particle size of 50 microns or below. The remainder of the sugar component can be supplied by conventional granulated sugar.

C. Shortening Component

In highly preferred embodiments, the present dry mix compositions for layer cakes can also comprise from about 6% to 16% of an emulsified shortening ingredient. However, other embodiments such as for angel food cake products, are substantially free (<0.58) of the shortening component. Preferably, the present dry mix compositions comprise from about 88 to about 138 of the shortening ingredient. Best results are obtained when the shortening component comprises from about 9% to 11% of the present dry mix compositions. Maintenance of shortening concentrations within these limits is essential for the realization of dry mixes in the form of free-flowing particles. Such concentrations are also important in providing cakes of acceptable textural quality.

Conventional shortening materials are suitable for use as the shortening ingredient of the present dry mixes. Such conventional shortening materials are well known in the cake mix preparation art. The conventional shortening useful herein is fatty glyceridic materials which can be classified on the basis of their physical state at room temperature. Liquid shortenings can be used in the present dry mix compositions and provide the advantage of ease of incorporation into dry mixes. Solid shortening can also be used and provide the advantage of desirable mouthfeel upon cake consumption. More commonly, and preferred for use herein, mixtures of liquid and solid shortenings are used in dry mixes. Such mixes can be fluid or plastic depending in part upon the level of solid fatty materials. Shortenings of this type comprise a liquid oil containing from about 2% to 26% normally solid fatty glycerides. That is, a solids content index ("SCI") at 70° F. (18° C.) and 4% to 6% at 100° F. (38° C.).

The solid fatty glycerides can include fatty monoglycerides and diglycerides of saturated fatty acids having 16 to 22 carbon atoms. The liquid shortening can be animal, vegetable or synthetic oil which is liquid at ordinary room temperatures. Representative of such liquid shortenings are coconut oil, palm kernel oil, cottonseed oil, peanut oil, olive oil, sunflower seed oil, sesame seed oil, corn oil, safflower oil, poppy seed oil, soybean oil, rapeseed oil, babassue oil and the like. Other suitable shortening materials and methods of shortening preparation are described in detail in Bailey, "Industrial Oil and Fat Products," (3rd ed. 1964) which is incorporated herein by reference.

Conventionally, the shortening ingredient of cake mixes is emulsified. That is, the shortenings provide a convenient carrier for addition of conventional baked goods emulsifiers to the dry mix. Such emulsifiers aid the realization of cakes with improved grain structure and cake texture. The emulsifier typically comprises from about 1% to 16% of the shortening component, preferably from about 5% to about 15% and, most preferably from about 10% to 15%.

The exact amount of emulsifier used is determined by the particular emulsifier employed and specific desired finished cake attributes. The art is replete with emulsifiers which are suitable for inclusion in the shortening component for the provision of cake mixes for layer cakes. Thus, selection of particular emulsifiers will pose no problems for the skilled artisan.

Partially esterified polyhydric compounds having surface active properties are exceptionally suitable for use herein. This class of emulsifiers includes among others, mono- and diglycerides of fatty acids, such as monopalmitin, monostearin, monoolein, and dipalmitin; partial fatty esters of glycols, such as propylene glycol monostearate and monobehenate; higher fatty acid esters of sugars, such as the partial palmitic and oleic acid esters of sucrose; and phosphoric and sulfuric acid esters, such as dodecyl glyceryl ether sulfate and monostearin phosphate. Other examples include the partial esters of hydroxy carboxylic acids, such as lactic, citric, and tartaric acids with polyhydric compounds, for example, glyceryl lactopalmitate, and the polyoxyethylene ethers of fatty esters of polyhydric alcohols, such as a polyoxyethylene ether of sorbitan monostearate or distearate. Fatty acids alone or esterified with a hydroxy carboxylic acid, e.g., stearoyl-2-lactylate, are also useful.

In those dry mix embodiments intended for use in preparation of angel food cakes, the shortening component is essentially eliminated. Angel food dry mixes can, however, further comprise about 2% to 10% of dried egg white solids. The egg white solids provide a protein foam into which the flour batter is dispersed prior to baking. In the preparation of angel food cake, when an unchlorinated flour is used, the finished cake has a final volume of only 80% to 90% of the cake made with chlorinated flour (chlorinated to a pH of 3.8). Moreover, the unchlorinated flour cake has a wetter and unpleasant rubbery texture. In contrast, when the present microwave treated cake flour is used, the finished cake has about 5% greater volume than chlorinated angel food cake and a more tender texture.

D. Chemical Leavening Agent

Another essential ingredient of the present dry mixes, whether for angel food or for layer cakes is a conventional chemical leavening agent. The chemical leavening comprises from about 0.5% to 4% of the present dry mixes, preferably from about 1.0% to 3.0% of the dry mixes.

The selection of a suitable chemical leavening or system from those known in the art will pose no problem for one skilled in the formulation of culinary dry mixes for layer cakes. In general, such systems are composed of a baking soda, e.g., sodium, potassium, or ammonium bicarbonate, etc., as a source of carbon dioxide on one hand, and one or more other common baking acids on the other. Suitable baking acids include sodium aluminum phosphate, anhydrous monocalcium phosphate, monocalcium pyrophosphate, and mixtures thereof. The preferred chemical leavening system for use in the present dry mixes includes any baking soda and a mixture of baking acids. The baking acid mixture comprises a first, slow-reacting baking acid selected from the group consisting of monocalcium phosphate and anhydrous sodium aluminum phosphate and dicalcium phosphate, and mixtures thereof, and a second, fast-reacting baking acid selected from the group consisting of monocalcium phosphate monohydrate, sodium acid pyrophosphate and mixtures thereof. In the preferred embodiment, the weight ratio of the first baking acid to the second baking acid is about 0.75:1 to 1.25:1.

E. Special Emulsifier

In certain highly preferred embodiments herein, the dry mixes further importantly include a triglycerol monostearate ("TGMS"). Surprisingly, TGMS assists a variety of finished baked goods eating quality attributes. TGMS addition beneficially affects the texture and formation of uniform and fine cell/texture and also assists leavening to provide further increases in volume. While dielectric heat treatment of unchlorinated cake flour alone improves both the volume and texture of resultant finished baked goods, the combination of TGMS with microwave treatment of unchlorinated cake flour provides unexpectedly even greater improvements in the combination of both volume and texture and eating qualities.

Good results in terms of texture improvement are obtained when the present dry mixes comprise about 0.1% to 1% of the TGMS. Better results are obtained when the TGMS comprises about 0.15% to 0.45% by weight of the dry mixes. In those preferred embodiments containing TGMS, the TGMS can be employed in addition, or in full or partial substitution for the conventional baked good emulsifiers described above.

TGMS is commercially available in food grades from several commercial sources including Grindsted Products under the trade name Triodan 55 as well as from Karlshamn Inc. or Vandenberg Co.

F. Optional Components

The present dry mixes can optionally contain a variety of additional ingredients suitable for rendering finished cakes prepared therefrom more organoleptically desirable. Such optional dry mix components include cocoa, egg white solids, salt, coloring agents, flavoring agents, nuts and fruit. If present, such optional components comprise from about 0.1% to 15% of the dry mixes of the present invention.

Another highly preferred optional ingredient in the present dry mix compositions is dry milk solids. Dry milk solids aid the structuring of the cake foam. If present, such dry milk solids comprise from about 0.5% to 2.0% of the present mixes.

Certain preferred mixes are preferably free of any ungelatinized pure starch components (<1%) other than, of course, added to the sucrose or flour components as free flow adjuvants. Such added, pure starch-free dry mixes are preferred due to their combination of lower cost yet high performance advantages. The lower cost stems importantly from avoidance of the high cost of such pure starch ingredients.

DRY MIX COMPOSITION PREPARATION

The present improved cake mixes of the present invention are prepared by blending the essential and optional components together in such a conventional manner as to produce a free-flowing dry mix. In a preferred method of dry mix preparation, the flour, the sucrose, the shortening, the leavening agent and any optional ingredients are blended in a ribbon blender for a period of about 8–20 minutes at a mix temperature below about 65° F. (18° C.). When a liquid oil is part of the shortening ingredient, then the oil is normally added during blending by means of an oil spray or by extruding the blend mixture through a spreader bar. Blending is continued after introduction of the oil until the oil lump count is from about 10% to 15% by weight on a number 10 U.S. Standard sieve. Best results are obtained when the temperature of the mix after blending is from about 65° to 70° F. (18° to 21° C.).

The mix is subsequently finished in a standard commercial finisher. Finishers are devices for reducing shortening lump size and for more intimately incorporating the shortening into a mix by impact mixing. Thus, finishing the mix in a finisher is highly preferred when the shortening component comprises a plastic shortening. Commercially available finishers generally include an exposure on which are mounted rapidly rotating blades. After finishing to insure reduction in lump count, larger sized optional ingredients such as nuts and fruits are then blended into the mix. The present dry mixes are then packaged in a conventional manner in conventionally suitable containers which typically hold specific weights of the dry mix.

An advantage of the present dry mixes is enhanced storage stability due to the low moisture content of the present microwave treated flour component.

DRY MIX COMPOSITION USE

The present dry mixes are conveniently prepared into finished cakes in the conventional manner by forming an aerated batter by mixing the dry mix in a household electric mixer, for example, for two minutes at medium or high speed, after having added water or other aqueous liquid, shortening and eggs or egg whites to the mix. The batter resulting from the mixing process is poured into a cake pan and baked, for example, for 25 to 40 minutes at 350° to 425° F. (177° to 218° C.).

Slightly greater quantities of moisture containing ingredients can be added to the present dry mixes to form batter based goods to compensate for the reduced moisture content of the microwave treated flour relative to higher moisture flours.

As discussed above, a wide variety of physical treatments for flour are known to improve the volume of baked goods of treated cake flour relative to untreated non-chlorinated cake flour. While several techniques can provide improvements in baking volume, such treatments unfortunately tend to have a material adverse effect upon the eating qualities of the finished baked goods. The finished eating quality tends to be characterized as being gummy, pasty, dry or grainy.

It is a surprising advantage that the dielectric heat treatment improves not only the baking volume of unchlorinated cake flour but also, and equally important, the appearance and eating qualities of the finished baked good.

In still another variation of the present invention, the present dielectric heating step can be used to improve the eating qualities of cake flours that have been heat treated by prior art methods. While the volume of such dielectric heat treated, heat treated or aged flours may or may not be further increased, their eating qualities will nonetheless be improved.

In a still further variation, the dielectric heat exposure step can be used to treat bread flours to improve their baking qualities. Generally, bread flours are not used in high ratio layer cakes because such flours are more expensive than cake flours and the eating qualities of cakes prepared from bread flours are inferior. However, if for some reason it were desired to use bread flours to make layer cakes, employment of the present methods would provide treated bread flours having improved baking properties relative to untreated, unchlorinated bread flour.

The following examples are offered to further illustrate but not to limit the invention disclosed herein.

EXAMPLE 1

A bench scale quantity of an improved, microwave treated flour substitute for chlorinated flour of the present invention was prepared using a home microwave oven.

An unchlorinated, bleached raw cake flour available from Mennel Milling Co. was selected for treatment. Such a flour is a soft (protein content of about 84) red winter wheat flour.

A 150 g batch having a moisture content of 124 was placed in a microwave oven (640 watt) and heated at full power for three minutes to reach a final temperature of 245° F. (118° C.). The microwave treated product had a final moisture content of 2.54. A carousel was used to rotate the flour batch during the microwave treatment step.

The microwave dried cake flour so produced was useful for addition with other dry mix ingredients for use in the preparation of a high ratio layer cake.

The bed depth of the flour during the microwave treatment step was about 80 mm.

The samples were tested using a Rapid Visco Analyzer Model 3Cr, manufactured by Newport Scientific (Narrabeen, Australia) and distributed in the United States by Foss Food Technology Corporation, Eden Prairie, Minn. Data collection and analysis using the RVA employs Thermoview, version 1.2 data analysis software supplied with the instrument.

The RVA analysis involves the following nine point testing procedure:
1. Obtain a representative flour sample and determine the present moisture using an appropriate moisture procedure.
2. RVA Temperature/Time Profile for the Thermocline Program
    0.) Idle Temperature 25° C.
    1.) Hydration Period 2 minutes
    2.) Ramp to 95° C. 6 minutes
    3.) End of Test 10 minutes
3. Prepare a concentrated buffer solution by dissolving 14.8 grams of anhydrous disodium phosphate (Na2HPO4) and 10.3 grams of citric acid monohydrate in a liter of distilled water. Dilute 10 to 1 (90 mls distilled water and 10 mls concentrated buffer) for use in the analysis.
4. Determine the sample size required for a 4 gram, 12% moisture basis (3.52 grams dry solids) using the following formula:

$$\text{sample size (grams)} = .52/[1-(\% \text{ moisture}/100)]$$

Determine the amount (in grams) of dilute buffer required using:

$$\text{dilute buffer (grams)} = 25 + [4 - \text{sample size grams}]$$

5. Weigh out the calculated sample size of the flour (+ or −0.01 grams) in a tared weigh boat.
6. Weigh out the calculated mass of dilute buffer in a tared RVA sample canister (+ or −0.01 grams). Leave the buffer and the tared canister on the balance for the next step in the procedure.
7. Transfer the flour to the sample canister on the balance. The balance should register 29.00 grams (+ or −0.02 grams) once the transfer is completed.
8. Place the sample spindle in the canister and gently rotate to disperse the flour. Place the canister/spindle in the RVA measuring head. Follow the procedure outline in the thermoview manual to proceed with the analysis.
9. Analyze the data using the "Thermoview" program. Take the slope between 4.7 and 5.3 minutes ("Pasting Slope"). Record the pasting peak using the "Cursor" option.

A convenient way of viewing the data is to have the data depicted in the form of a graph of the pasting curve expressed in SNU's versus temperature which shows the starch's pasting curve.

The results of such testing are graphically depicted as curve 16 in FIGS. 1–3.

EXAMPLE 2

A pilot plant quantity of an improved microwave treated flour substitute for chlorinated flour of the present invention was prepared using the raw flour identified in Example 1.

About a 50 lb batch having a moisture content of 11% was placed in a 13,500 watt microwave oven heated at full power such that the average residence time of each 5 lb sample was 45 seconds, during which time the 5 lb unit of flour reached a final temperature of 270° F. (132° C.). Using a continuous belt feeder, at any given moment, 5 lbs flour was present in cavity and exposed to the microwave energy field. The microwave treated product had a final moisture content of 1.8%. The bed depth was about 30 mm and the microwave field strength was about 125 V/cm.

The microwave dried cake flour so produced was useful for addition with other dry mix ingredients for use in the preparation of a high ratio layer cake.

EXAMPLE 3

A dry mix for white layer cake of the present invention for a high ratio layer cake was prepared using the present microwave treated flour using product of Example 1 according to the following formulation:

| Ingredient | Amount |
|---|---|
| Flour (2.5% moisture basis) | 92 g |
| Sugar (Baker's special sucrose) | 140 |
| Shortening (with 8% emulsifier)[1] | 50 |
| Non-fat dry milk solids | 12 |
| Egg white (dry) | 9 |
| Baking powder | 5 |
| Salt | 3 |
| | 311 g |

[1] A plastic vegetable shortening with 5% to 6% propylene glycol monoester and 2½% to 3% monoglyceride available from Kraft Anderson-Clayton Humko.

monoglyceride available from Kraft Anderson-Clayton Humko.

A finished layer cake was prepared by combining the above dry mix with 148 g of added water. It was combined to prepare a cake batter. The cake batter was then beaten to form a batter, poured into a round baking container and baked at 350° F. (177° C.) for 35 minutes to form a finished baked layer cake.

For comparison, a series of otherwise identical formulations were prepared according to the recipe given above. Each cake used the same version of milled soft wheat flour. The only difference between each cake formulation was in the treatment given to the flour component sample prior to preparing the batter and baking. However, only 140 g of water was used to add to the dry mix to prepare cake batters of equivalent moisture in view of the difference in flour moisture content. The finished cakes were examined for volume and texture. The volume and texture comparisons for each of the samples are summarized below:

| | |
|---|---|
| Cake 1 (made with unchlorinated cake flour) Severely sunken center. Coarse grained crumb. Gummy texture. | Volume = 780 cc |
| Cake 2 (cake flour chlorinated to the standard pH 4.6) Slightly domed surface, symmetrical. Very fine grained cells. Rather dry texture. | Volume = 950 cc |
| Cake 3 (unchlorinated cake flour, microwave-treated to 2.5% residual moisture) Surface more flat than domed. Very fine grained cells. Tender, moist crumb. | Volume = 970 cc |
| Cake 4 (unchlorinated cake flour heat treated at 270° F. to 2.5% residual moisture) Slightly domed surface. Fine cells. Pasty to gummy texture, like unchlorinated. | Volume = 950 cc |
| Cake 5 (unchlorinated cake flour aged at 75° F. (24° C.) for eight months) Appearance and texture very similar to cake 4, with gummy eating quality. | Volume = 940 cc |
| Cake 6 (flour of cake 5, later subjected to microwave treatment) Domed surface, very fine grained cells. Tender, moist crumb, not gummy. | Volume = 970 cc |

The results of such testing show that cakes 3 and 6 of the present invention provide the combination of improved volume and improved eating qualities compared to otherwise similar based products.

EXAMPLE 4

A dry mix for angel food cake of the present invention was prepared using product of Example 2 having the following formulation:

| Ingredient | Amount |
|---|---|
| Microwave treated unchlorinated cake flour (1% moisture basis) | 115 g |
| Powdered sugar | 166 |
| Granulated sugar | 200 |
| Egg white solids | 35 |
| Cream of tartar | 5 |
| Vanilla | 5 |
| Flavor | 2 |
| Salt | 1 |
| | 529 g |

The volume of cake prepared from the microwave treated flour was 10% greater than that of the cake made from flour chlorinated to pH 3.8. The texture was very moist, the crumb was tender. In contrast, the untreated cake flour produced a finished cake exhibiting the least volume. The finished cake suffered from a rubbery, "wet" texture.

EXAMPLE 5

A dry mix for white layer cake of the present invention having TGMS was prepared having the following formulation:

| Ingredient | Amount |
|---|---|
| Microwave treated unchlorinated cake flour (1% moisture basis) | 90 g |
| Sugar (same as #3) | 140 |
| Shortening | 50 |
| Non-fat dry milk solids | 12 |
| Egg white | 9 |
| Baking powder | 5 |
| Salt | 3 |
| Triglycerol monostearate | 1 |
| | 310 g |

About 150 g water was added to the above formulation and aerated to form a cake batter. The cake batter was then baked in a round container at 350° F. (177° C.) for 30 minutes to form a finished white layer cake of the present invention. The finished baked good exhibited a nicely domed appearance, high volume (20% more than microwaved version #3 in Example 3) and excellent eating qualities.

EXAMPLE 6

A layer cake for a silver white layer cake of the present invention is prepared involving the following recipe:

Silver-white cake
- 4 egg whites
- 1½ cups sugar
- 2¼ cups cake flour[1]
- 1 cup milk (2% milk fat)
- ½ cup shortening
- 1 T. double-acting baking powder
- 1 tsp salt
- 1 tsp vanilla extract
- ¼ tsp almond extract 1. The flour was microwave heated to a final moisture content of 3%.

The resultant cake had slightly higher volume than either chlorinated or unchlorinated/untreated versions, but markedly improved texture than latter (tender, fine-grained, moist but not gummy crumb character).

EXAMPLE 7

A bench scale quantity of an improved, radio frequency (19 MHz) heat treated flour substitute for chlorinated flour of the present invention was prepared using a radio frequency unit having a power of about 12 kW.

An unchlorinated, bleached raw cake flour available from Kansas City Mill, General Mills, Inc., was selected for treatment. Such a flour is a soft (protein content of about 8%) red winter wheat flour.

A 6500 g batch having a moisture content of 12% was placed in a radio frequency chamber and heated at full power for 20 minutes to reach a final temperature of 257° F. (125° C.). The radio frequency treated product had a final moisture content of 2.5%.

The bed depth of the flour during the radio frequency treatment step was about 65 mm.

The radio frequency exposed cake flour so produced was useful for addition with other dry mix ingredients for use in the preparation of a high ratio layer cake.

The peak pasting viscosity curve was prepared using the procedure of Example 1 and is depicted in FIG. 4 as curve 44. It should be appreciated, however, that the radio frequency treated flour is of a later crop year than the flour of Example 1 and the three curves replicated from FIG. 3.

EXAMPLE 8

A white layer cake comprising radio frequency heated non-chlorinated flour of the present invention is prepared involving the following formulation:

| Ingredient | Weight % |
|---|---|
| Sugar | 43.00 |
| Treated flour[1] | 43.00 |
| Shortening | 9.00 |
| Minor ingredients | 5.00 |
| | 100.00% |

[1]The flour was ratio frequency heat treated to a final moisture content of 2.5%.

1. The flour was radio frequency heat treated to a final moisture content of 2.5%.

The treated flour is an unbleached second flour treated as described in Example 7 (Bowman Mills). 530 grams of dry mix of the above formulation is admixed with 270 grams of water, 72 grams oil, and 150 grams of whole eggs. The blend is mixed into an aerated batter, poured into two circular baking pans and baked at 350° F. (177° C.) for about 30 minutes to prepare a finished baked layer cake. The volume of the layer cake had an averaged value of 900 cc.

An otherwise identical baked layer cake was prepared except that a similar but untreated cake flour was used in substitution for the Rf heated flour as a control experiment. The amount of water added to form the batter is adjusted for the higher moisture of the untreated flour. The volume of the finished cake from the control was about 620 cc.

The results of this testing indicate that in a high sugar layer cake prepared from a dry mix comprising a radio frequency treated cake flour gives superior volume relative to a layer cake containing an untreated cake flour.

What is claimed is:

1. A flour providing improved texture and volume to batter based food products, said flour prepared by the process of:

heating a flour having an initial moisture content of greater than 8% by weight to a moisture content of about 1% to 6% by weight by exposure to radio frequency heating at a frequency ranging from 3 MHz to 300 MHz.

2. The flour of claim 1 wherein the flour is selected from the group consisting of unchlorinated flour, chlorinated flour, heat treated flour, aged flour and mixtures thereof.

3. The flour of claim 2 wherein the flour is unchlorinated.

4. The flour of claim 3 wherein the flour has a protein content of about 4% to 8%.

5. The flour of claim 1 wherein the flour is a cake flour.

6. The flour of claim 5 wherein the flour has been reduced in moisture content to about 2% to 5%.

7. The flour of claim 6 wherein the flour has been reduced by radio frequency heating to a moisture content of about 2.5%.

8. The flour of claim 1 wherein the flour is a bread flour.

9. The flour of claim 1 wherein the flour is an all-purpose flour.

10. The flour of claim 9 wherein the flour is bleached.

11. The flour of claim 6 wherein the flour has a peak pasting viscosity of at least 350 Stir Number Units.

12. The flour of claim 11 wherein the flour has a peak pasting viscosity of at least 400 Stir Number Units.

13. The flour of claim 12 wherein the flour has a peak pasting viscosity of at least 450 Stir Number Units.

14. A cake flour providing improved volume and texture to batter based baked food products having a peak pasting viscosity of greater than 450 Stir Number Units.

15. The flour of claim 14 wherein the flour is radio frequency heat treated from an initial moisture content of greater than 8% to a final moisture content of less than 6%.

16. An unchlorinated cake flour prepared by the process comprising:

heating an unchlorinated cake flour having a moisture content of at least 8% by weight to dry the flour to a less than 6% by weight by exposure to a high intensity dielectric heating at a frequency ranging from 10 GHz to 3 MHz and at a field intensity of at least 50 V/cm.

17. The flour of claim 16 having a peak pasting viscosity of greater than 450 Stir Number Units.

* * * * *

UNITED STATES PATENT AND TRADEMARK OFFICE
CERTIFICATE OF CORRECTION

PATENT NO. : 5,456,930
DATED : Oct. 10, 1995
INVENTOR(S) : Todd W. Gusek, James R. Korslund, Vinod W. Padhye It is certified that error appears in the above-identified patent and that said Letters Patent is hereby corrected as shown below:

Col. 3, line 49 - "60°" should be -- 160 --.

Col. 6, line 21 - "8%" should be -- >8% --.

Col. 9, line 54 - "and 0 expressed" should be -- and expressed --.

Col. 13, line 28 - "458 to 508" should be -- 45% to 50% --.

Col. 13, line 42 - "508" should be -- 50% --.

Col. 13, line 51 - "(<0.58)" should be -- (<0.5%) --.

Col. 13, line 53 - "88 to about 138" should be -- 8% to about 13% --.

Col. 17, line 35 - "84" should be -- 8% --.

Col. 17, line 36 - "124" should be -- 12% --.

Col. 17, line 41 - "2.54" should be -- 2.5% --.

Col. 18, line 11 - ".52" should be -- 3.52 --.

Col. 19, line 24 - Delete the repeated line "monoglyceride available from Kraft Anderson-Clayton Humko."

Signed and Sealed this

Second Day of April, 1996

Attest:

BRUCE LEHMAN

*Attesting Officer*          *Commissioner of Patents and Trademarks*